US010782957B2

(12) United States Patent
Bamba et al.

(10) Patent No.: US 10,782,957 B2
(45) Date of Patent: Sep. 22, 2020

(54) INFORMATION PROCESSING DEVICE, RELAY DEVICE, INFORMATION PROCESSING SYSTEM, AND SOFTWARE UPDATE METHOD

(71) Applicant: Sony Interactive Entertainment Inc., Tokyo (JP)

(72) Inventors: Syunsuke Bamba, Tokyo (JP); Akitsugu Tsuchiya, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/556,214

(22) PCT Filed: Apr. 6, 2016

(86) PCT No.: PCT/JP2016/061325
§ 371 (c)(1),
(2) Date: Sep. 6, 2017

(87) PCT Pub. No.: WO2016/163429
PCT Pub. Date: Oct. 13, 2016

(65) Prior Publication Data
US 2018/0039491 A1 Feb. 8, 2018

(30) Foreign Application Priority Data

Apr. 9, 2015 (JP) .................. 2015-080334

(51) Int. Cl.
*G06F 8/65* (2018.01)
*G06F 11/00* (2006.01)
(Continued)

(52) U.S. Cl.
CPC .................. *G06F 8/65* (2013.01); *G06F 8/71* (2013.01); *G06F 11/00* (2013.01); *G06F 13/00* (2013.01); *G06F 13/102* (2013.01)

(58) Field of Classification Search
CPC ...... G06F 8/60–656; G06F 8/71; G06F 11/00; G06F 11/30–3096; G06F 13/00; G06F 13/102
See application file for complete search history.

(56) References Cited

U.S. PATENT DOCUMENTS 6,002,426 A * 12/1999 Back ...................... H04N 7/181
348/87
6,075,905 A * 6/2000 Herman .................... G06K 9/32
348/588

(Continued)

FOREIGN PATENT DOCUMENTS

CN 102461198 A 5/2012
CN 104346198 A 2/2015
(Continued)

OTHER PUBLICATIONS

International Preliminary Report on Patentability and Written Opinion for corresponding PCT Application No. PCT/JP2016/061325, 10 pages, dated Oct. 19, 2017.

(Continued)

*Primary Examiner* — S. Sough
*Assistant Examiner* — Zheng Wei
(74) *Attorney, Agent, or Firm* — Matthew B. Dernier, Esq.

(57) ABSTRACT

In a video image generation device connected to a peripheral device via a video image relay device, a version acquisition unit acquires from the video image relay device information related to version of firmware installed in the video image relay device. If the version of the firmware installed in the video image relay device is older than version of firmware requested by basic software installed in the video image generation device, an update request unit supplies the video image relay device with firmware for the relay device (Continued)

included in the basic software in order to update accordingly the firmware installed in the video image relay device.

16 Claims, 10 Drawing Sheets

(51) Int. Cl.
  *G06F 13/00* (2006.01)
  *G06F 8/71* (2018.01)
  *G06F 13/10* (2006.01)

(56) References Cited

U.S. PATENT DOCUMENTS

| | | | |
|---|---|---|---|
| 6,360,362 B1 | 3/2002 | Fichtner | |
| 6,728,787 B1* | 4/2004 | Leigh | G06F 9/4411 713/1 |
| 6,832,373 B2* | 12/2004 | O'Neill | G06F 8/654 717/171 |
| 7,770,165 B2* | 8/2010 | Olson | G06F 9/44589 717/168 |
| 7,907,293 B2* | 3/2011 | Zimmerman | G06F 3/1211 358/1.13 |
| 8,701,100 B2 | 4/2014 | Jung | |
| 8,904,107 B2* | 12/2014 | Matsumura | G06F 8/65 711/114 |
| 8,924,950 B2 | 12/2014 | McDonald | |
| 8,966,101 B2* | 2/2015 | Thiyagarajan | G06F 8/65 370/310 |
| 9,134,993 B2 | 9/2015 | Miyama | |
| 9,146,731 B2* | 9/2015 | Ohara | G06F 8/654 |
| 9,158,529 B2* | 10/2015 | Jeon | G06F 8/654 |
| 9,395,976 B2* | 7/2016 | Iijima | G06F 8/654 |
| 9,430,723 B1* | 8/2016 | Panda | G06F 3/12 |
| 9,727,124 B2* | 8/2017 | Lee | G06F 1/329 |
| 9,910,659 B2* | 3/2018 | Krishnamurthy, Sr. | G06F 8/65 |
| 2002/0073304 A1* | 6/2002 | Marsh | G06F 8/65 713/1 |
| 2002/0138567 A1* | 9/2002 | Ogawa | G06F 8/65 709/203 |
| 2002/0163742 A1* | 11/2002 | Togino | G02B 17/02 359/834 |
| 2002/0188934 A1* | 12/2002 | Griffioen | G06F 8/65 717/170 |
| 2003/0140134 A1* | 7/2003 | Swanson | G06F 8/64 709/223 |
| 2005/0057991 A1 | 3/2005 | Kosugiyama | |
| 2005/0144616 A1* | 6/2005 | Hammond | G06F 8/65 717/173 |
| 2006/0143600 A1* | 6/2006 | Cottrell | G06F 21/572 717/168 |
| 2007/0169090 A1* | 7/2007 | Kang | G06F 8/65 717/168 |
| 2007/0261046 A1* | 11/2007 | Miller | G06F 8/65 717/168 |
| 2008/0088937 A1* | 4/2008 | Tang | G02B 27/0172 359/630 |
| 2008/0198920 A1 | 8/2008 | Yang | |
| 2008/0231868 A1* | 9/2008 | Onsen | G06F 3/1204 358/1.1 |
| 2009/0009792 A1* | 1/2009 | Zimmerman | G06F 3/1211 358/1.15 |
| 2009/0015569 A1* | 1/2009 | Machida | G06Q 30/02 345/204 |
| 2009/0235242 A1* | 9/2009 | Kawaguchi | H04N 1/00002 717/168 |
| 2011/0239208 A1* | 9/2011 | Jung | G06F 8/65 717/170 |
| 2012/0072896 A1 | 3/2012 | Watanabe | |
| 2012/0272230 A1* | 10/2012 | Lee | G06F 1/329 717/173 |
| 2013/0019236 A1* | 1/2013 | Nakagawa | G06F 8/65 717/170 |
| 2013/0117377 A1* | 5/2013 | Miller | H04L 67/38 709/205 |
| 2013/0159991 A1* | 6/2013 | Sato | G06F 8/65 717/173 |
| 2013/0169872 A1* | 7/2013 | Ko | H04N 5/44 348/553 |
| 2013/0182068 A1 | 7/2013 | Cheng | |
| 2013/0246706 A1* | 9/2013 | Matsumura | G06F 8/65 711/114 |
| 2014/0282481 A1* | 9/2014 | Ohara | G06F 8/654 717/172 |
| 2014/0282485 A1* | 9/2014 | Nakamura | G06F 8/65 717/173 |
| 2014/0298310 A1* | 10/2014 | Iijima | G06F 8/654 717/170 |
| 2015/0040114 A1 | 2/2015 | Miyama | |
| 2016/0182877 A1* | 6/2016 | Deluca | G06F 3/013 348/53 |
| 2016/0196132 A1* | 7/2016 | Searle | H04L 41/082 717/173 |
| 2016/0231996 A1* | 8/2016 | Tamura | G06F 13/00 |
| 2016/0294614 A1* | 10/2016 | Searle | G06F 8/654 |
| 2016/0378457 A1* | 12/2016 | Adachi | G06F 9/445 713/181 |
| 2017/0235565 A1* | 8/2017 | Kryzer | G06F 8/65 717/170 |

FOREIGN PATENT DOCUMENTS

| | | |
|---|---|---|
| EP | 2439643 A1 | 4/2012 |
| JP | 2005078343 A | 3/2005 |
| JP | 2010519856 A | 6/2010 |
| JP | 2012238972 A | 12/2012 |
| KR | 20110107579 A | 10/2011 |
| KR | 20140002055 A | 1/2014 |
| WO | 2008103748 A1 | 8/2008 |

OTHER PUBLICATIONS

International Search Report for corresponding PCT Application No. PCT/JP2016/061325, 3 pages, dated Jul. 5, 2016.
Extended European Search Report for corresponding EP Application No. 16776595.7, 7 pages, dated Oct. 8, 2018.
Office Action for corresponding KR Application No. 520160478407, 18 pages, dated Jan. 28, 2019.
Office Action for corresponding KR Application No. 10-2017-7028398, 16 pages, dated Jul. 22, 2019.
Office Action for corresponding CN Application No. 201680017712.1, 37 pages, dated Mar. 25, 2020.

* cited by examiner

INFORMATION PROCESSING DEVICE, RELAY DEVICE, INFORMATION PROCESSING SYSTEM, AND SOFTWARE UPDATE METHOD

TECHNICAL FIELD

The present invention relates to techniques for updating basic software or firmware in an information processing system with which peripheral devices are connected.

BACKGROUND ART

There have been developed video image systems having a video image generation device such as a game machine or a personal computer connected with a head-mounted display device that presents its user with video images on a display panel in front of the user's eyes to enhance realistic sensation. Peripheral devices such as the head-mounted display device are operated using dedicated firmware.

SUMMARY

Technical Problem

The firmware of a peripheral device needs to be updated independently of the basic software of the video image generation device with which the peripheral device is connected. However, the user may find it inconvenient if time is spent on updating the firmware of the peripheral device every time the video image generation device is started even though the peripheral device is not used.

The present invention has been made in view of the above circumstances. An object of the invention is to provide techniques for efficiently updating basic software or firmware in an information processing system with which peripheral devices are connected.

Solution to Problem

In solving the above problem and according to one embodiment of the present invention, there is provided an information processing device connected with a peripheral device via a relay device. The information processing device includes a version acquisition unit configured to acquire from the relay device information related to version of firmware installed in the relay device, a version comparison unit configured to compare the version of the firmware installed in the relay device with version of firmware requested by basic software installed in the information processing device, and an update request unit configured such that if the version of the firmware installed in the relay device is older than the version of the firmware requested by the basic software installed in the information processing device, the update request unit supplies the relay device with firmware for the relay device included in the basic software in order to update accordingly the firmware installed in the relay device.

According to another embodiment of the present invention, there is provided a relay device connecting a peripheral device to an information processing device. The relay device includes a version notification unit configured to acquire information related to version of firmware installed in the relay device and notify the information processing device of the information, and an update unit configured such that if the version of the firmware installed in the relay device is older than version of firmware requested by basic software installed in the information processing device, the update unit receives from the information processing device firmware for the relay device included in the basic software in order to update accordingly the firmware installed in the relay device.

According to a further embodiment of the present invention, there is provided an information processing system including an information processing device and a relay device connecting a peripheral device to the information processing device. The information processing device includes a version acquisition unit configured to acquire from the relay device information related to version of firmware installed in the relay device, a version comparison unit configured to compare the version of the firmware installed in the relay device with version of firmware requested by basic software installed in the information processing device, and an update request unit configured such that if the version of the firmware installed in the relay device is older than the version of the firmware requested by the basic software installed in the information processing device, the update request unit supplies the relay device with firmware for the relay device included in the basic software in order to update accordingly the firmware installed in the relay device. The relay device includes a version notification unit configured to acquire the information related to the version of the firmware installed in the relay device and notify the information processing device of the information, and an update unit configured such that if the version of the firmware installed in the relay device is older than the version of the firmware requested by the basic software installed in the information processing device, the update unit receives from the information processing device the firmware for the relay device included in the basic software in order to update accordingly the firmware installed in the relay device.

According to a further embodiment of the present invention, there is provided a software update method updating firmware of a relay device or basic software of an information processing device, the relay device and the information processing device being included in an information processing system, the relay device being used to connect a peripheral device to the information processing device. The software update method includes a version acquisition step of acquiring from the relay device information related to version of firmware installed in the relay device, a version comparison step of comparing the version of the firmware installed in the relay device with version of firmware requested by the basic software installed in the information processing device, and an update request step of, if the version of the firmware installed in the relay device is older than the version of the firmware requested by the basic software installed in the information processing device, supplying the relay device with firmware for the relay device included in the basic software in order to update accordingly the firmware installed in the relay device.

Incidentally, if other combinations of the above-outlined composing elements or the above expressions of the present invention are converted between different forms such as a method, a device, a system, a computer program, a data structure, and a recording medium, they still constitute effective embodiments of the present invention.

Advantageous Effect of Invention

According to the present invention, basic software or firmware in an information processing system with which peripheral devices are connected is updated efficiently.

DESCRIPTION OF EMBODIMENT

Figure 1:
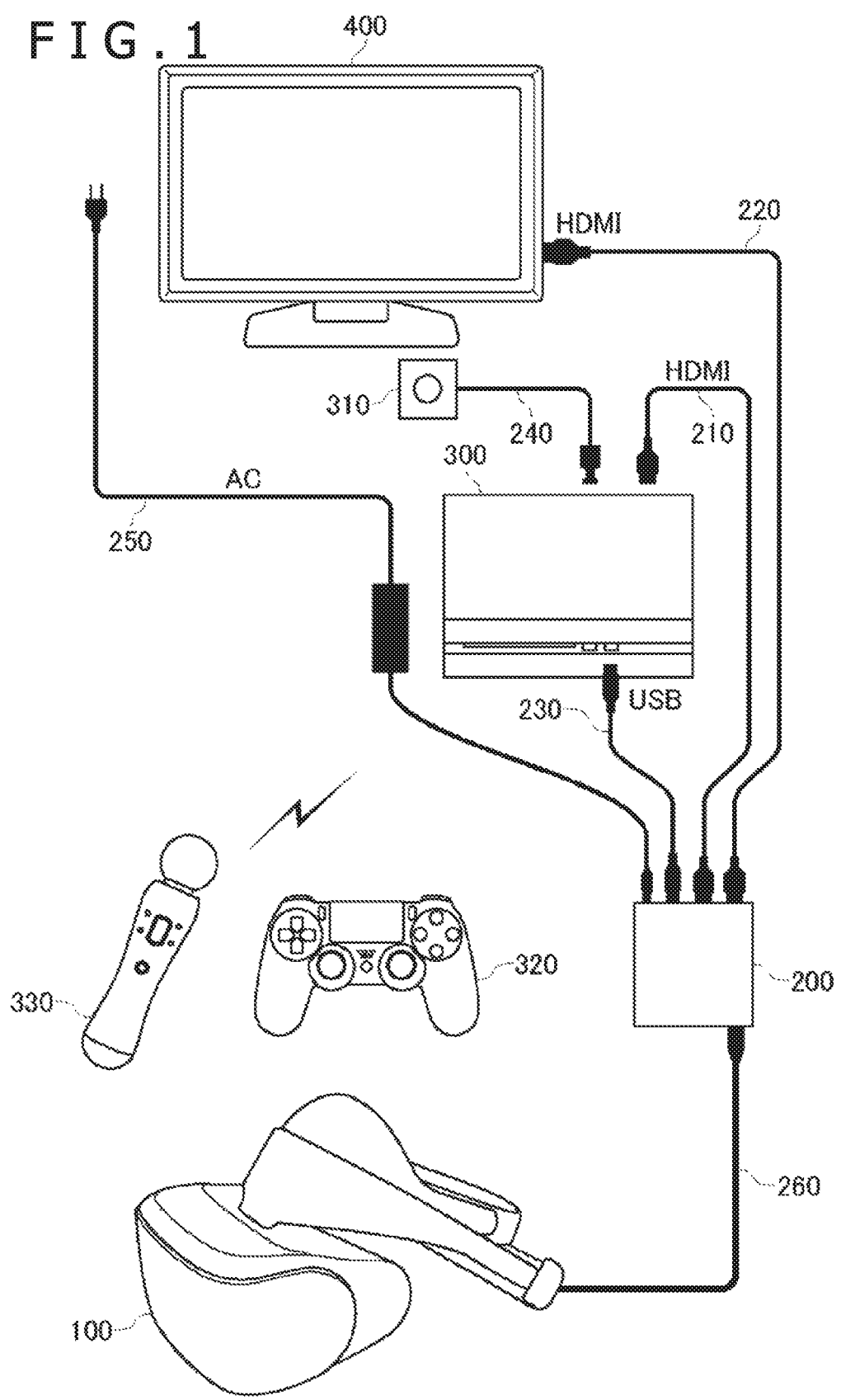
FIG. 1 is a configuration diagram of a video image system as one embodiment.

FIG. 1 is a configuration diagram of a video image system as one embodiment.

A video image generation device 300 is a typical information processing device according to the present application. More specifically, the video image generation device 300 is a game machine or a personal computer, for example, which generates video images by computer graphics. Although not shown, the video image generation device 300 may connect and communicate with networks to receive data from servers or to transmit data to other terminals.

A camera 310 may be connected to the video image generation device 300 using a connection cable 240. A wireless controller 320 and a motion controller 330 may also be connected wirelessly to the video image generation device 300.

A video image relay device 200 is connected to the video image generation device 300 via an interface such as a universal serial bus (USB) using a connection cable 230. A head-mounted display device 100 is connected to the video image relay device 200 using a dedicated cable 260. The head-mounted display device 100 is a typical peripheral device associated with the present application.

A high-definition multimedia interface (HDMI; registered trademark) output terminal of the video image generation device 300 is connected with an HDMI input terminal of the video image relay device 200 via a connection cable 210. An HDMI output terminal of the video image relay device 200 is connected with an HDMI input terminal of a display device 400 via a connection cable 220.

The video image relay device 200 is connected to a power source via a power cable 250. It is assumed here that the video image relay device 200 is always turned on. Obviously, if the head-mounted display device 100 acting as a peripheral device is not used, the video image relay device 200 may be turned off.

The video image relay device 200 relays video images output from the video image generation device 300 to the display device 400 and to the head-mounted display device 100. The video images generated by the video image generation device 300 are output through the HDMI output terminal of the video image generation device 300 and input to the HDMI input terminal of the video image relay device 200 via the connection cable 210.

The video images input to the HDMI input terminal of the video image relay device 200 are output unmodified from the HDMI output terminal of the video image relay device 200. From there, the video images are input to the HDMI input terminal of the display device 400 via the connection cable 220. At the same time, the video images input to the HDMI input terminal of the video image relay device 200 are converted to an image format suitable for the head-mounted display device 100, before being input to the head-mounted display device 100 via the dedicated cable 260.

That is, the video image relay device 200 relays the video images unmodified from the video image generation device 300 to the display device 400. At the same time, the video image relay device 200 converts the video images coming from the video image generation device 300 into a format suitable for the head-mounted display device 100 before relaying the video images to the head-mounted display device 100. This allows the user wearing the head-mounted display device 100 to view the video images in front of his or her eyes, while enabling other users to view the video images conventionally on the display device 400. The video image relay device 200 thus functions as a converter-distributer that may convert as needed the video images coming from the video image generation device 300 before distributing them to multiple display devices.

The basic software for executing the commands of applications such as games is installed in the video image generation device 300. The firmware for the head-mounted display device 100 is installed in the video image relay device 200. The basic software and the firmware need to be updated as needed. The data necessary for updating the basic software and the firmware is either read from a recording medium inserted in the video image generation device 300 and written to a storage area of the video image generation device 300, or downloaded from servers over networks into the storage area of the video image generation device 300.

Figure 2A:
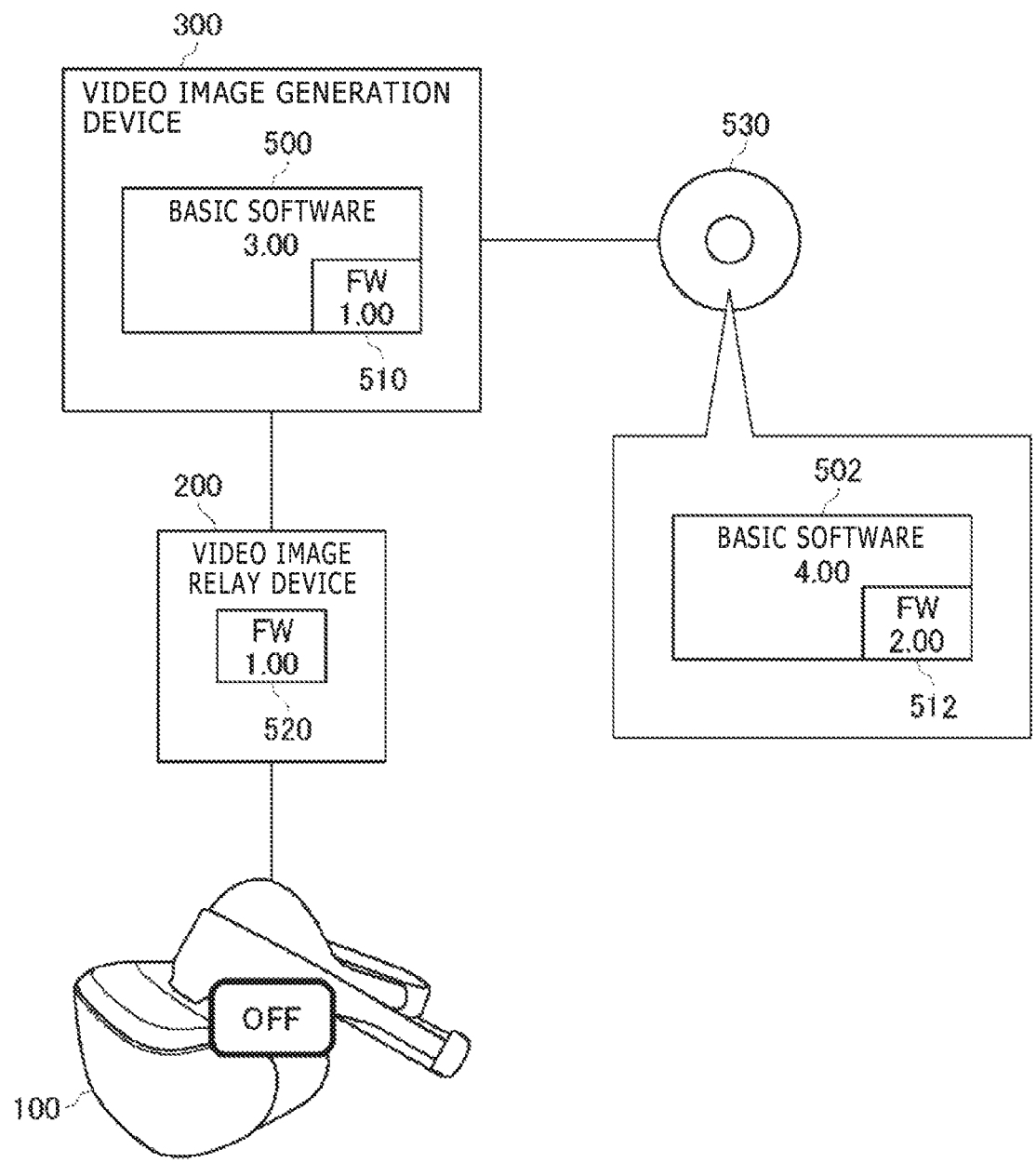
FIG. 2A is an explanatory view showing a step of updating firmware of a video image relay device included in FIG. 1.
Figure 2B:
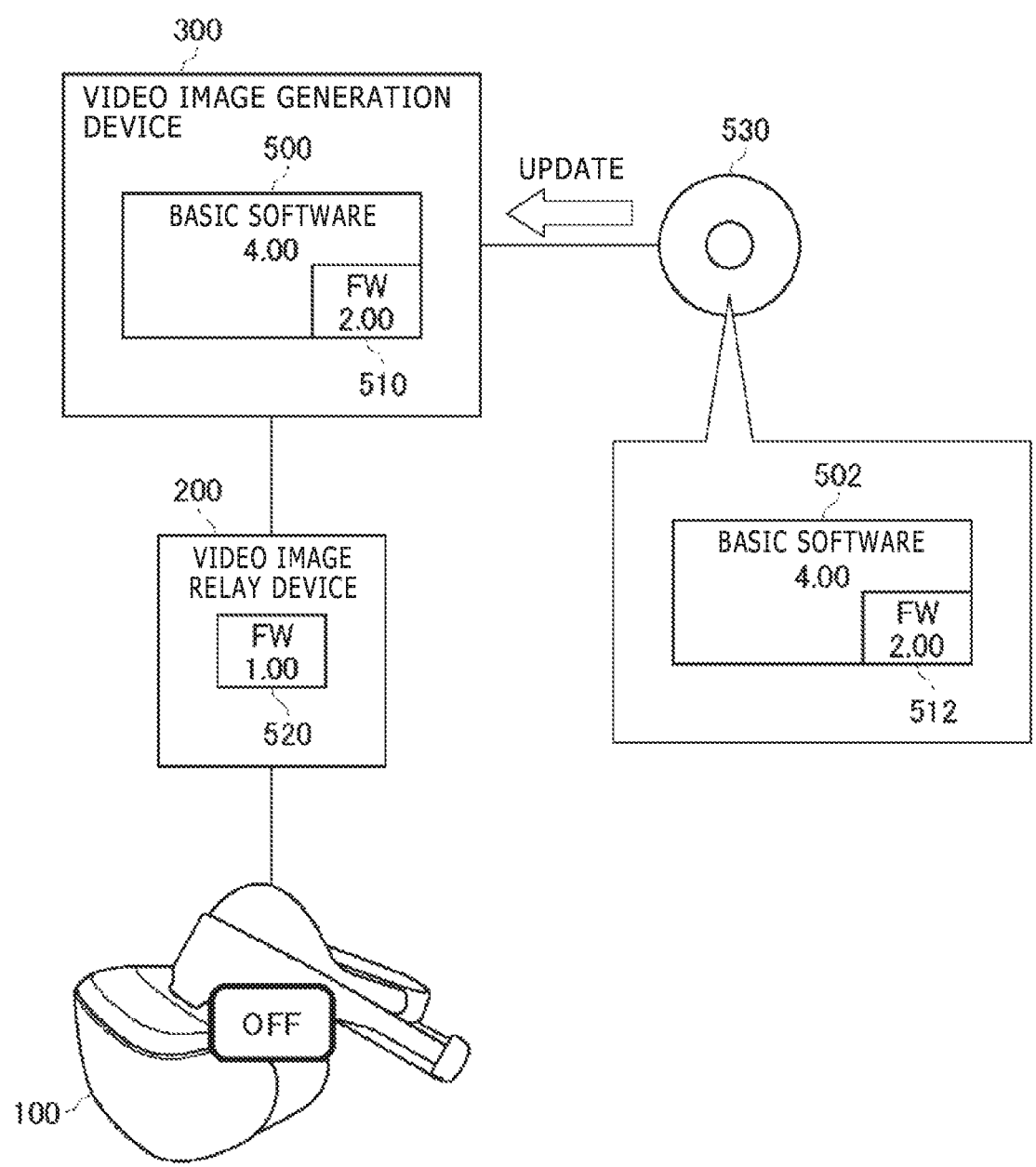
FIG. 2B is an explanatory view showing another step of updating the firmware of the video image relay device in FIG. 1.
Figure 2C:
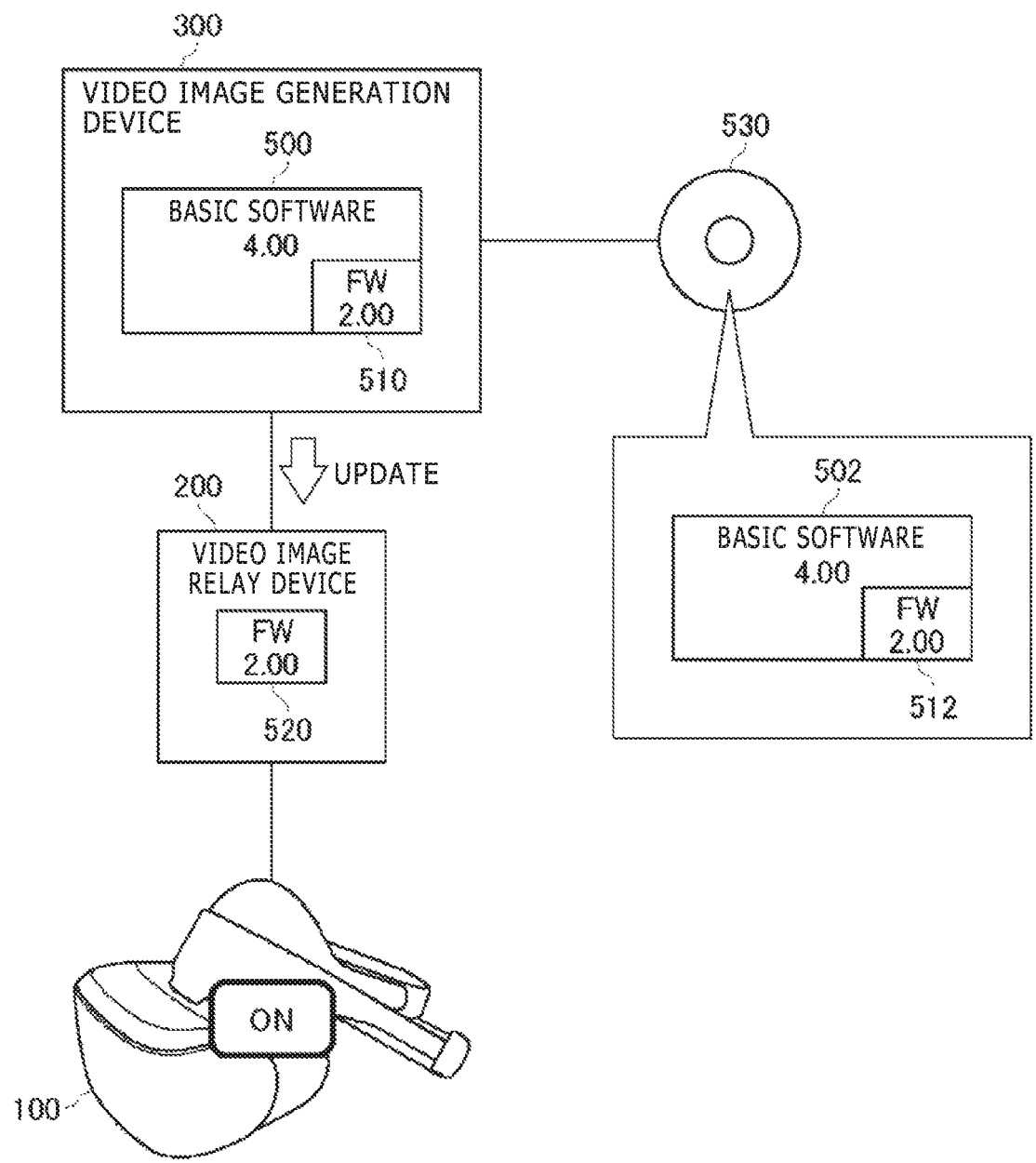
FIG. 2C is an explanatory view showing another step of updating the firmware of the video image relay device in FIG. 1.

FIGS. 2A to 2C are explanatory views showing steps of updating the firmware of the video image relay device 200.

Basic software 500 installed in the video image generation device 300 includes firmware 510 to be installed in the video image relay device 200 for use by the head-mounted display device 100. This is a configuration similar to one in which the operating system of a computer includes the drivers of various peripheral devices. The driver for a peripheral device included in the operating system is read and installed into the computer when that peripheral device is configured for use. In like manner, the firmware 510 for the head-mounted display device 100 included in the basic software 500 is installed into the video image relay device 200 before the head-mounted display device 100 is used.

As shown in FIG. 2A, the basic software 500 of version 3.00 is initially installed in the video image generation device 300. The basic software 500 of version 3.00 includes the firmware 510 of version 1.00. Firmware 520 of version 1.00 is installed in the video image relay device 200. The head-mounted display device 100 is turned off.

A recording medium 530 storing applications such as games is inserted in the video image generation device 300.

The recording medium 530 stores the basic software of the latest version along with the applications. In this case, the recording medium 530 stores basic software 502 of version 4.00 that includes firmware 512 of version 2.00. The firmware 512 of version 2.00 is the firmware of the latest version of which the performance is confirmed by the basic software 502 of version 4.00.

As shown in FIG. 2B, when the recording medium 530 is inserted, the video image generation device 300 compares the version of the basic software stored on the recording medium 530 with the version of the basic software already installed in the video image generation device 300. If the version of the basic software on the recording medium 530 is newer than the version of the basic software already installed in the video image generation device 300, the video image generation device 300 reads the basic software 502 of the latest version 4.00 from the recording medium 530 and updates the currently installed basic software accordingly. The basic software 502 stored on the recording medium 530 includes the firmware 512 of the latest version 2.00. Thus the update brings the basic software 500 of the video image generation device 300 to version 4.00 and the firmware 510 included in the basic software 500 to version 2.00.

At the time of updating the basic software 500 of the video image generation device 300 in FIG. 2B, the head-mounted display device 100 is turned off. At this point, the firmware 520 of the video image relay device 200 has yet to be updated; the firmware 520 of the old version 1.00 remains unchanged.

As shown in FIG. 2C, when the head-mounted display device 100 is turned on, the video image generation device 300 is notified of information about the version of the firmware 520 already installed in the video image relay device 200. The video image generation device 300 compares the version of the firmware 520 currently installed in the video image relay device 200 with the version of the firmware requested by the basic software 500 of the video image generation device 300. If the version of the firmware 520 in the video image relay device 200 is older than the version requested by the basic software 500 of the video image generation device 300, the firmware 510 of the latest version included in the basic software 500 is supplied to the video image relay device 200 in order to update the firmware of the video image relay device 200.

In this case, a predetermined region of the basic software 500 prescribes that the version of the firmware requested by the basic software 500 of the video image generation device 300 be version 2.00 or higher. The version of the firmware 520 currently installed in the video image relay device 200 is version 1.00, which is older than version 2.00. Thus the firmware 510 of the latest version 2.00 included in the basic software 500 is supplied to the video image relay device 200 to bring the firmware 520 of the video image relay device 200 to version 2.00.

As described above with reference to FIGS. 2A to 2C, even when the basic software 500 of the video image generation device 300 is updated together with the firmware 510 included in the basic software 500, the firmware 520 of the video image relay device 200 is not updated until the head-mounted display device 100 is turned on. Only when the head-mounted display device 100 is turned on, is the firmware 520 of the video image relay device 200 updated with the firmware 510 of the latest version included in the basic software 500 of the latest version in the video image generation device 300.

The user may find it inconvenient if it is necessary to wait for the firmware 520 of the video image relay device 200 to be updated despite the user not using the head-mounted display device 100. According to the firmware update method of the present embodiment, when the head-mounted display device 100 is turned on, i.e., at the time the head-mounted display device 100 is used, the firmware 520 of the video image relay device 200 is updated as needed. This method offers the advantage of not giving the user unnecessary frustration at the time of updating the firmware.

Figure 3A:
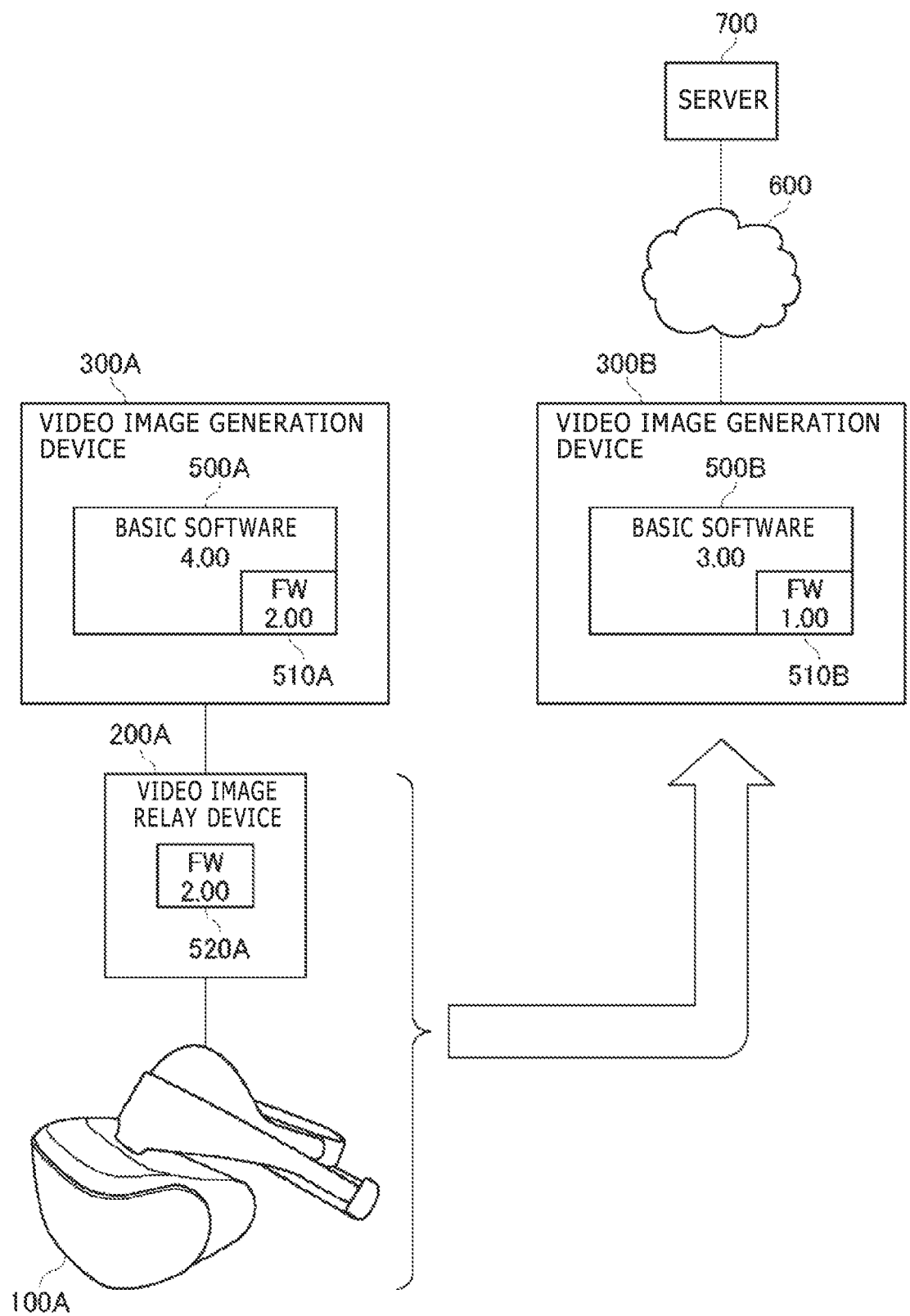
FIG. 3A is an explanatory view showing a step of updating basic software of a video image generation device included in FIG. 1.
Figure 3B:
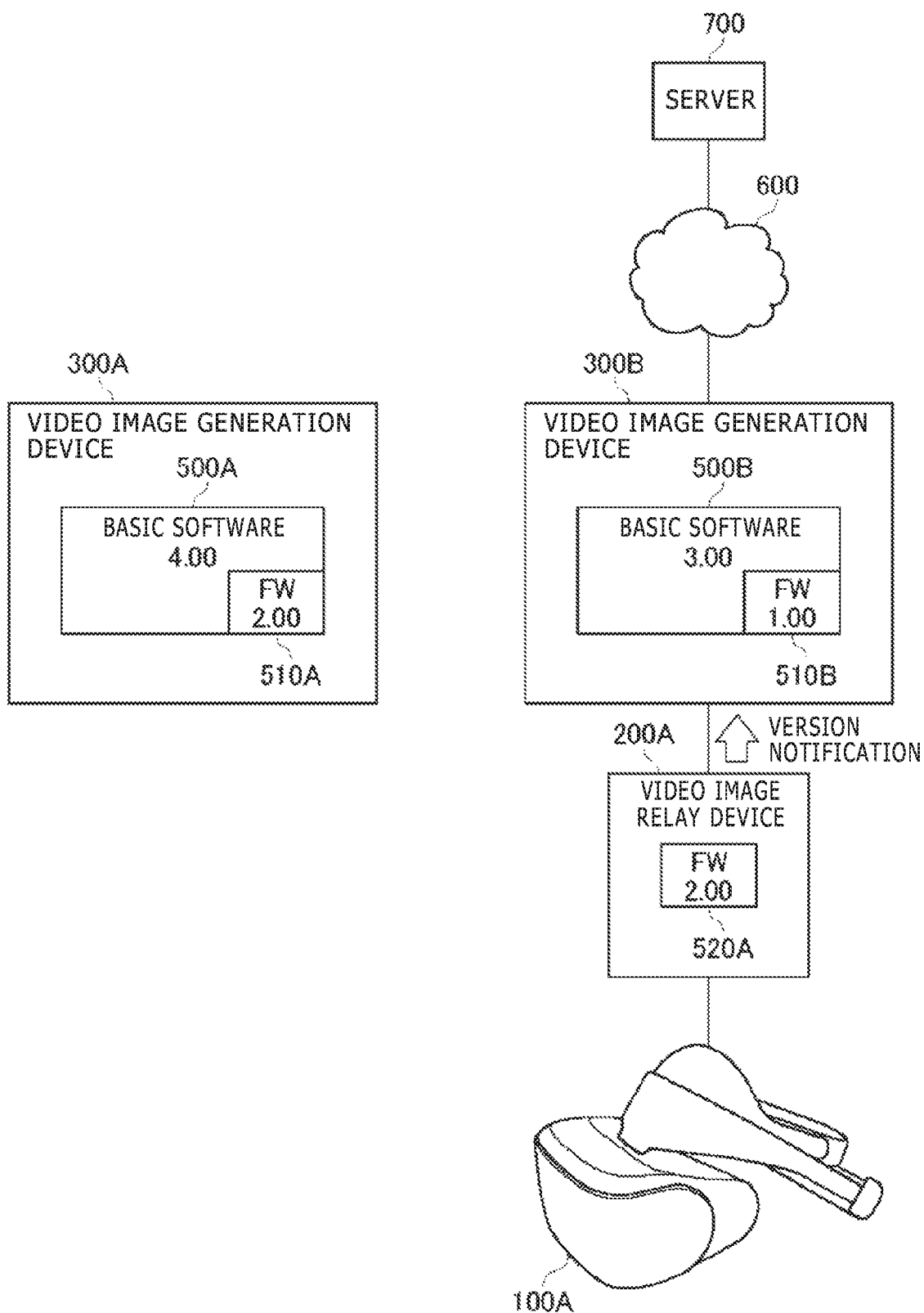
FIG. 3B is an explanatory view showing another step of updating the basic software of the video image generation device in FIG. 1.
Figure 3C:
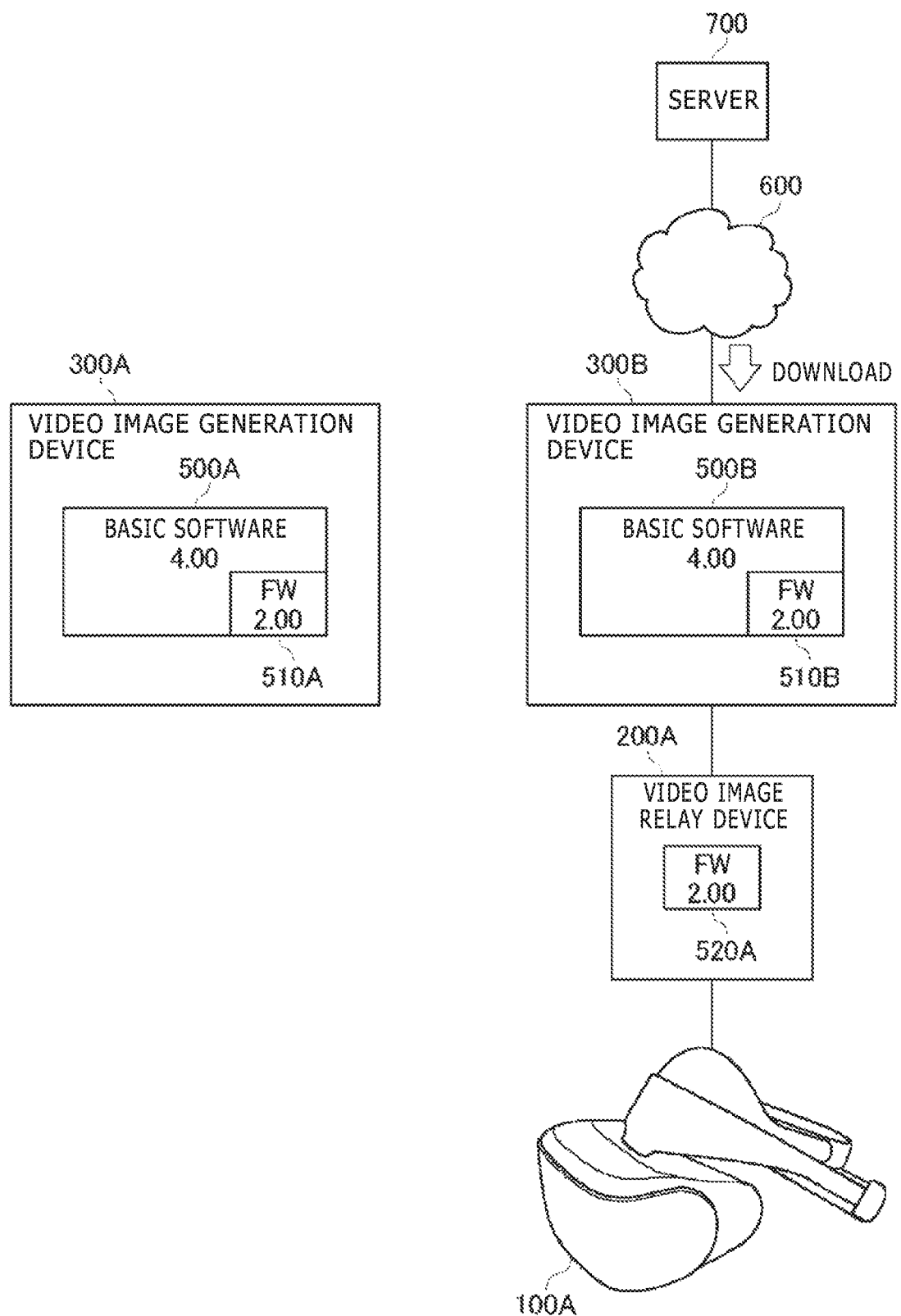
FIG. 3C is an explanatory view showing another step of updating the basic software of the video image generation device in FIG. 1.

FIGS. 3A to 3C are explanatory views showing steps of updating the basic software of the video image generation device 300.

As shown in FIG. 3A, a video image generation device 300A of user A is connected with a video image relay device 200A that in turn is connected with a head-mounted display device 100A. Basic software 500A of version 4.00 is installed in the video image generation device 300A. The basic software 500A includes firmware 510A of version 2.00. Firmware 520A of version 2.00 is installed in the video image relay device 200A.

User A disconnects the video image relay device 200A and the head-mounted display device 100A from the video image generation device 300A, and connects the disconnected devices to a video image generation device 300B of user B. The situation assumed here may be one in which user B is a friend of user A's and user A brings his or her video image relay device 200A and the head-mounted display device 100A from his or her place to user B's place. Basic software 500B of version 3.00 is installed in the video image generation device 300B of user B. The basic software 500B includes firmware 510B of version 1.00.

As shown in FIG. 3B, the video image generation device 300B of user B is connected with the video image relay device 200A and the head-mounted display device 100A of user A. At this point, the version of the firmware 520A installed in the video image relay device 200A of user A is version 2.00, whereas the version of the basic software 500B installed in the video image generation device 300B is version 3.00. The basic software 500B of version 3.00 installed in the video image generation device 300B supports the firmware of version 1.00 but does not comply with the firmware 520A of the new version 2.00.

When the head-mounted display device 100A is turned on, the video image relay device 200A notifies the video image generation device 300B of information about the version of the basic software requested by the firmware 520A of version 2.00 installed in the video image relay device 200A. In this case, a predetermined region of the firmware prescribes that the firmware of version 2.00 request the basic software of version 4.00 or higher. This information is conveyed to the video image generation device 300B.

As shown FIG. 3C, the video image generation device 300B compares the version of the basic software conveyed from the video image relay device 200A and requested by the firmware 520A of the video image relay device 200A with the version of the basic software 500B in the video image generation device 300B. If the version of the basic software 500B is older than the version conveyed from the video image relay device 200A, the video image generation device 300B downloads the basic software 500B of a new version from a server 700 via a network 600 and installs the downloaded basic software.

In this case, the version of the basic software requested by the firmware 520A of the video image relay device 200A is version 4.00 or higher, whereas the version of the basic software 500B in the video image generation device 300B is version 3.00, which is older than version 4.00. Thus the basic software of the latest version 4.00 is downloaded from the server 700 and installed into the video image generation device 300B.

As a result of this, the basic software 500B of the video image generation device 300B is replaced with the basic software of version 4.00 requested by the firmware 520A of version 2.00 in the video image relay device 200A. The basic software thus comes to support the firmware 520A of version 2.00 in the video image relay device 200A.

Figure 4:
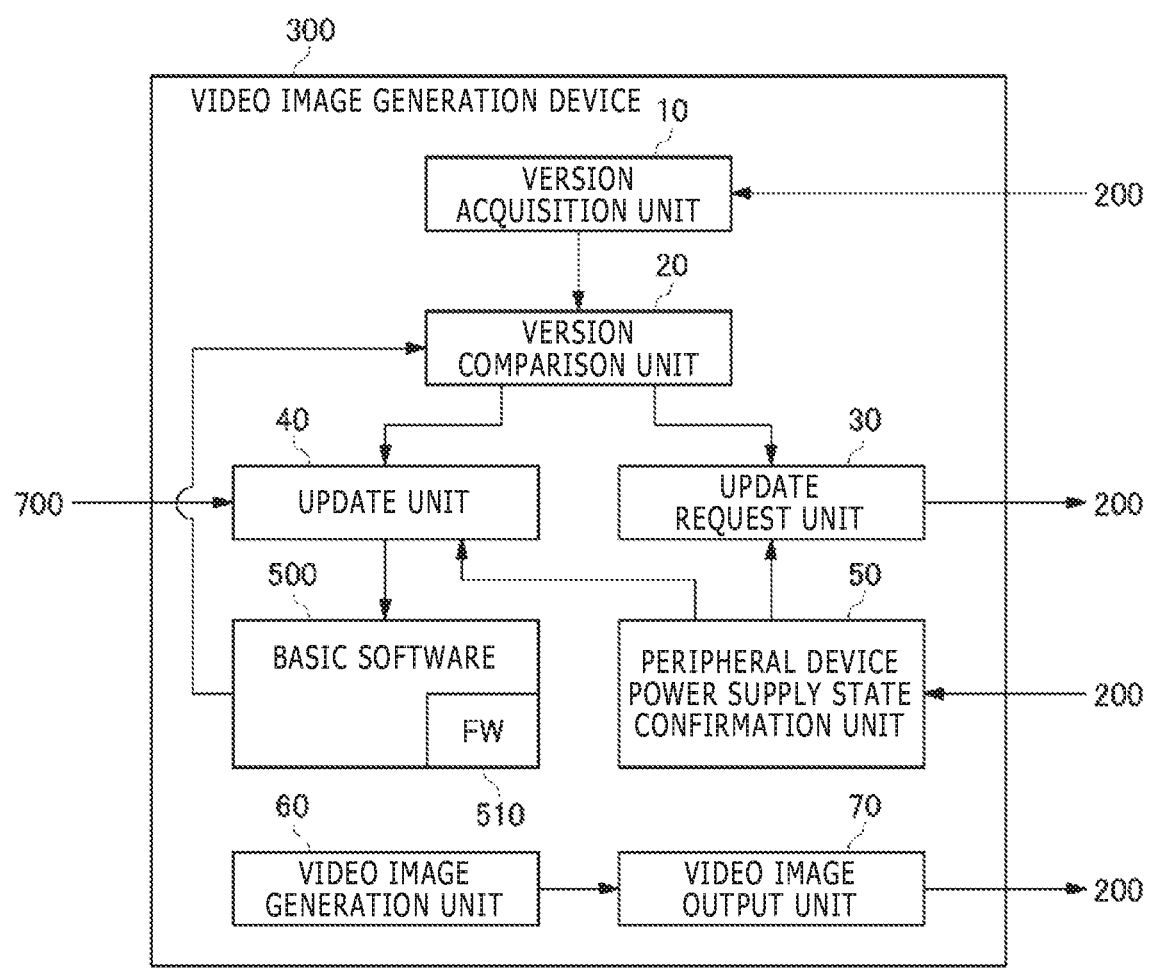
FIG. 4 is a configuration diagram of the video image generation device in FIG. 1.

FIG. 4 is a configuration diagram of the video image generation device 300. The drawing shows primarily the functional configuration of the video image generation device 300 for updating the basic software and the firmware. The functional configuration of the video image relay device 200 is implemented by hardware, by software, or by a combination of both.

A version acquisition unit 10 receives from the video image relay device 200 information about the version of the firmware 520 installed in the video image relay device 200. When the video image relay device 200 is connected with the video image generation device 300 using a cable 230 such as a USB interface cable and when the video image relay device 200 is turned on, the information about the version of the firmware 520 is conveyed from the video image relay device 200 to the video image generation device 300 via the cable 230.

A version comparison unit 20 receives from the version acquisition unit 10 the information about the version of the firmware 520 in the video image relay device 200. The version comparison unit 20 also acquires information about the version of the firmware requested by the basic software 500 installed in the video image generation device 300.

The information about the version of the firmware requested by the basic software 500 installed in the video image generation device 300 is written in a predetermined region of the basic software 500. The information may be read from that region. The firmware 510 itself of the version requested by the basic software 500 installed in the video image generation device 300 is included in the basic software 500. Information about the version of the firmware 510 included in the basic software 500 may be read as the information about the version of the firmware requested by the basic software 500.

Next, the version comparison unit 20 compares the version of the firmware 520 installed in the video image relay device 200 with the version of the firmware requested by the basic software 500 installed in the video image generation device 300. If the version of the firmware 520 installed in the video image relay device 200 is older than the version of the firmware requested by the basic software 500 installed in the video image generation device 300, the version comparison unit 20 notifies an update request unit 30 of the need to update the firmware of the video image relay device 200.

Given the notification of the need for the update from the version comparison unit 20, the update request unit 30 supplies the video image relay device 200 with the firmware 510 included in the basic software 500 of the video image relay device 200 in order to update accordingly the firmware 520 installed in the video image relay device 200.

A peripheral device power supply state confirmation unit 50 receives from the video image relay device 200 information about a power supply on/off state of the head-mounted display device 100, which is a typical peripheral device connected to the video image relay device 200. The peripheral device power supply state confirmation unit 50 then performs control so as not to let the update request unit 30 update the firmware 520 of the video image relay device 200 until the head-mounted display device 100 is turned on.

The version acquisition unit 10 further acquires from the video image relay device 200 the information about the version of the basic software requested by the firmware 520 installed in the video image relay device 200. The version acquisition unit 10 transfers the acquired information to the version comparison unit 20.

The version comparison unit 20 further compares the version of the basic software requested by the firmware 520 installed in the video image relay device 200 with the version of the basic software 500 installed in the video image generation device 300. If the version of the basic software 500 installed in the video image generation device 300 is older than the version of the basic software requested by the firmware 520 installed in the video image relay device 200, the version comparison unit 20 notifies an update unit 40 of the need to update the basic software 500 of the video image generation device 300.

Given the notification of the need for the update from the version comparison unit 20, the update unit 40 downloads the basic software of the latest version from the server 700 via the network 600 and updates the basic software 500 of the video image generation device 300 to the latest version.

The peripheral device power supply state confirmation unit 50 performs control so as not to let the update unit 40 update the basic software 500 of the video image generation device 300 until the head-mounted display device 100 is turned on.

A video image generation unit 60 generates video images of games or applications and transfers the generated video images to a video image output unit 70. The video image output unit 70 transmits the video image data to the video image relay device 200 via the HDMI interface connection cable 210.

Figure 5:
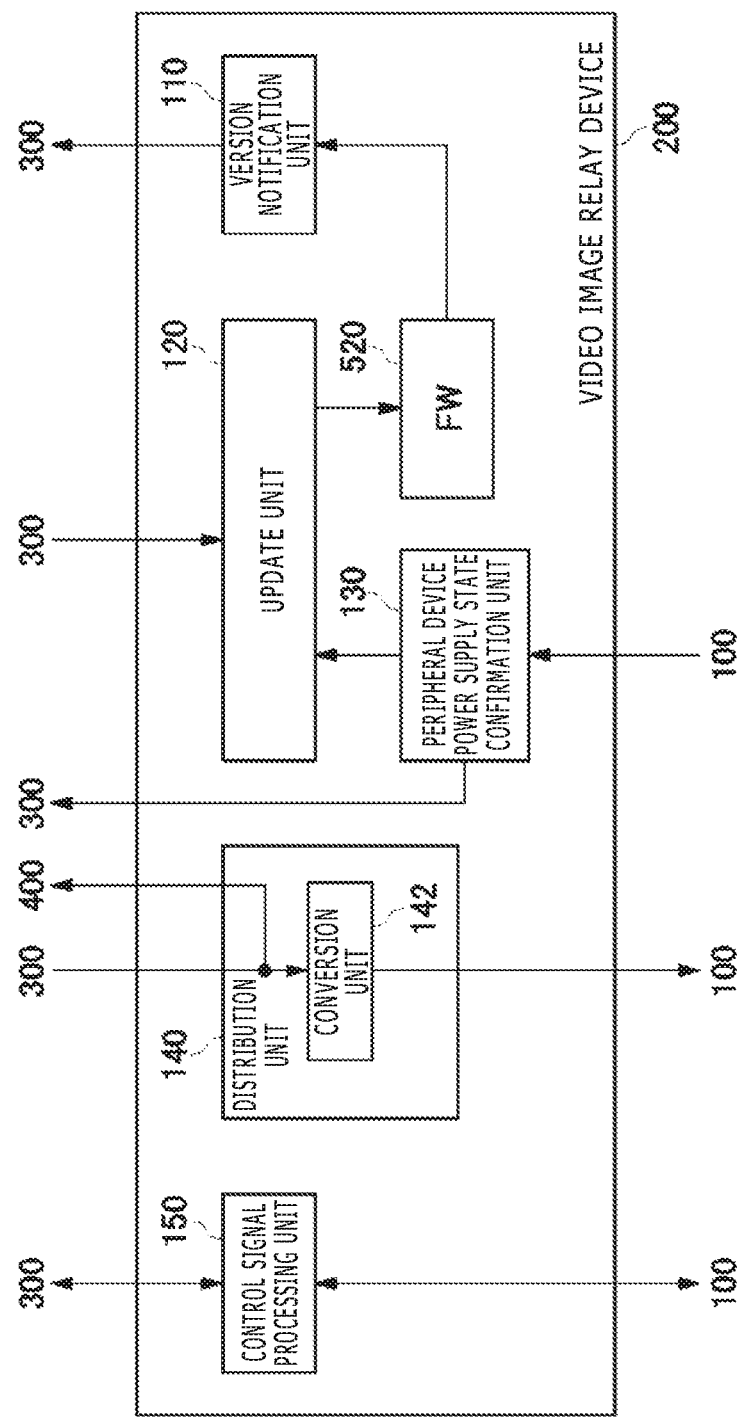
FIG. 5 is a configuration diagram of the video image relay device in FIG. 1.

FIG. 5 is a configuration diagram of the video image relay device 200. The functional configuration of the video image relay device 200 is implemented by hardware, by software, or by a combination of both.

A version notification unit 110 acquires the information about the version of the firmware 520 installed in the video image relay device 200 and notifies the video image generation device 300 of the acquired information.

If the version of the firmware 520 installed in the video image relay device 200 is older than the version of the firmware requested by the basic software 500 installed in the video image generation device 300, an update unit 120 receives from the video image generation device 300 the firmware 510 included in the basic software 500 and updates accordingly the firmware 520 installed in the video image relay device 200.

A peripheral device power supply state confirmation unit 130 acquires the information about the power supply on/off state of the head-mounted display device 100 from the head-mounted display device 100, which is a typical peripheral device connected to the video image relay device 200. Using the acquired information, the peripheral device power supply state confirmation unit 130 performs control so as not to let the update unit 120 update the firmware 520 of the video image relay device 200 until the head-mounted display device 100 is turned on.

Also, the peripheral device power supply state confirmation unit 130 transmits to the video image generation device 300 the information about the power supply on/off state of the head-mounted display device 100.

The version notification unit 110 further notifies the video image generation device 300 of the information about the version of the basic software requested by the firmware 520 installed in the video image relay device 200. The information about the version of the basic software requested by the firmware 520 is written in a predetermined region of the firmware 520. The information may be read from that region. As described above, if the version of the basic software 500 installed in the video image generation device 300 is older than the version of the basic software requested by the firmware 520 installed in the video image relay device 200 according to the version information conveyed from the version acquisition unit 10 in the video image relay device 200, the video image generation device 300 updates its basic software 500 via the network.

A distribution unit 140 receives video images from the video image generation device 300 and transmits the received video images to the display device 400 via the HDMI interface connection cable 220. The distribution unit 140 includes a conversion unit 142 that converts the video images received from the video image generation device 300 into a format ready for display on the head-mounted display device 100.

The head-mounted display device 100 adopts optical lenses of large curvatures to provide the user with video images of a large viewing angle in front of and around the user in an arrangement allowing the user to look into a display panel through the lenses. The distortion aberration of the lenses of large curvatures distorts video images viewed through the lenses. This problem is bypassed by having images corrected beforehand so that they will appear normally when viewed through the lenses of large curvatures. The images thus corrected are displayed on the display panel of the head-mounted display device 100. This allows the user to view the images correctly when looking at the display panel through the lenses of large curvatures.

The conversion unit 142 takes the video images generated by the video image generation device 300 for the ordinary display device 400 and converts the video images by taking into consideration the above-mentioned lens distortion of the head-mounted display device 100, before transmitting the video images to the head-mounted display device 100.

A control signal processing unit 150 receives signals for controlling the head-mounted display device 100 from the video image generation device 300 and transmits the signals to the head-mounted display device 100. The control signal processing unit 150 further receives data such as attitude information from the head-mounted display device 100 and transmits the data to the video image generation device 300.

Figure 6:
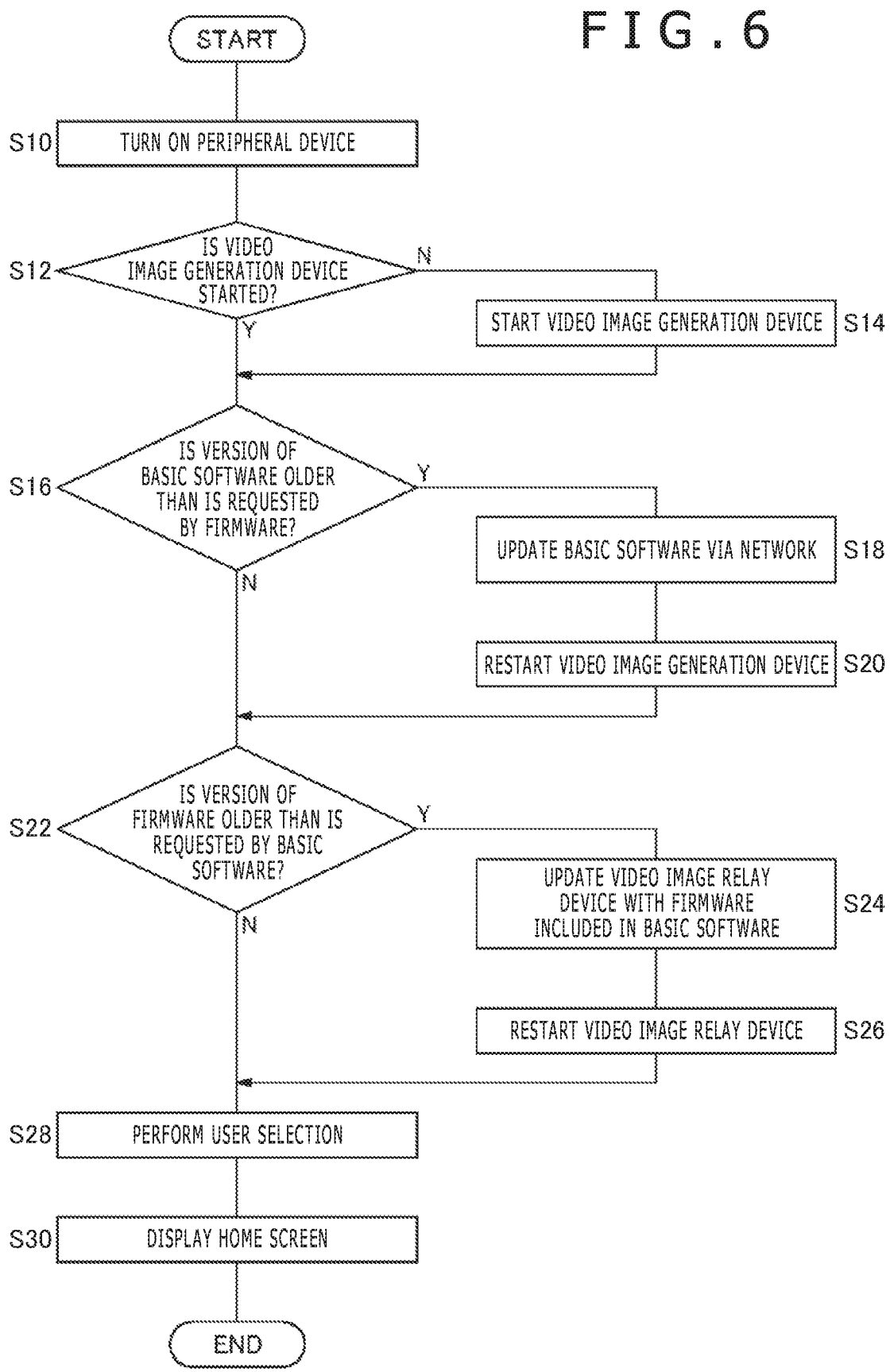
FIG. 6 is a flowchart showing the steps of updating the basic software and the firmware in the video image system in FIG. 1.

FIG. 6 is a flowchart showing the steps of updating the basic software and the firmware in the video image system of the present embodiment.

The user turns on the head-mounted display device 100, which is a peripheral device (S10). If the video image generation device 300 is not started yet (N in S12), the video image generation device 300 is started (S14). If the video image generation device 300 is already started (Y in S12), and if the version of the basic software installed in the video image generation device 300 is older than the version of the basic software requested by the firmware installed in the video image relay device 200 (Y in S16), the basic software of the latest version is downloaded via the network, and the basic software of the video image generation device 300 is updated accordingly (S18). The video image generation device 300 is then restarted (S20).

Next, if the version of the firmware installed in the video image relay device 200 is older than the version of the firmware requested by the basic software installed in the video image generation device 300 (Y in S22), the firmware 520 installed in the video image relay device 200 is updated using the firmware 510 included in the basic software 500 (S24). The video image relay device 200 is then restarted (S26).

When the update necessary for the basic software 500 of the video image generation device 300 or for the firmware 520 of the video image relay device 200 is completed, with the video image generation device 300 or the video image relay device 200 restarted following the update, user selection is performed on a login screen (S28). A home screen is then displayed (S30).

Although not discussed in connection with the above embodiment, the firmware 520 of the video image relay device 200 may be updated manually for the purpose of fixing bugs. In such a case, the firmware is downloaded directly from the server via the network for the update without waiting for the basic software 500 of the video image generation device 300 to be updated. In case of a failure such as faulty operation of the head-mounted display device 100, a recovery menu may be used to reinstall the firmware 520 of the video image relay device 200.

According to the software update method of the present embodiment described above, if the version of the firmware 520 in the video image relay device 200 is older than the version of the firmware requested by the basic software 500 of the video image generation device 300, the firmware 520 of the video image relay device 200 is updated using the firmware 510 included in the basic software 500.

The firmware 520 of the video image relay device 200 is not updated until the head-mounted display device 100 is turned on. This makes it possible to avoid situations such as one in which the user must wait for the home screen to appear until the firmware 520 of the video image relay device 200 is updated despite the head-mounted display device 100 not being used.

Because the firmware 510 included in the basic software 500 of the video image generation device 300 is used to update the firmware 520 of the video image relay device 200, the firmware 520 of the video image relay device 200 is rapidly updated. There is no need for the video image generation device 300 to be connected with the network in order to download the firmware of the latest version.

If the version of the basic software 500 in the video image generation device 300 is older than the version of the basic software requested by the firmware 520 of the video image relay device 200, the basic software 500 of the video image generation device 300 is updated to the latest version via the network.

In that case, too, the basic software 500 of the video image generation device 300 is not updated until the head-mounted display device 100 is turned on. This also makes it possible to avoid the situation in which the user must wait for the basic software 500 of the video image generation device 300 to be updated despite the head-mounted display device 100 not being used.

According to the present embodiment described above, at the time the head-mounted display device 100 is used, the basic software 500 of the video image generation device 300 and the firmware 520 of the video image relay device 200 are guaranteed to be the mutually requested versions. The relationship between the version of the basic software and the version of the firmware is prescribed in such a manner that they are automatically updated to the mutually requested versions. This enables the peripheral devices such as the head-mounted display device 100 to be always used in accordance with the basic software and the firmware of appropriate versions without having to designate the version of the firmware for the peripheral devices such as the head-mounted display device 100 on the side of applications such as games.

While the present invention has been described in conjunction with a specific embodiment given as an example, it should be understood by those skilled in the art that the above-described composing elements and various processes may be combined in diverse ways and that such combinations, variations and modifications also fall within the scope of the present invention.

Whereas the method of updating the firmware of the video image relay device 200 was explained in connection with the above embodiment, the head-mounted display device 100 itself has firmware installed therein. The firmware of the head-mounted display device 100 is included in the firmware of the video image relay device 200 and is supplied to the head-mounted display device 100 from the video image relay device 200. When the firmware of the video image relay device 200 is updated upon power-up of the head-mounted display device 100, the firmware of the head-mounted display device 100 may be arranged to be updated simultaneously.

If the functional configuration of the video image relay device 200 is included in the video image generation device 300, the video image generation device 300 and the video image relay device 200 may be integrated to form an "integrated video image generation device." The head-mounted display device 100 is directly connected to the integrated video image generation device. In such a case, the firmware update method discussed above in connection with the embodiment may be applied to updating the firmware of the head-mounted display device 100. Upon power-up of the head-mounted display device 100, the firmware of the head-mounted display device 100 is updated using the firmware included in the basic software of the integrated video image generation device.

The head-mounted display device 100 was described above as a typical peripheral device in connection with the embodiment. Alternatively, any peripheral device other than the head-mounted display device 100 may be used. The firmware update method of the above-described embodiment may also be applied to updating the firmware of such peripheral devices.

REFERENCE SIGNS LIST

10 Version acquisition unit, 20 Version comparison unit, 30 Update request unit, 40 Update unit, 50 Peripheral device power supply state confirmation unit, 60 Video image generation unit, 70 Video image output unit, 100 Head-mounted display device, 110 Version notification unit, 120 Update unit, 130 Peripheral device power supply state confirmation unit, 140 Distribution unit, 142 Conversion unit, 150 Control signal processing unit, 200 Video image relay device, 300 Video image generation device, 310 Camera, 320 Wireless controller, 330 Motion controller, 400 Display device, 500 Basic software, 510 Firmware, 520 Firmware, 530 Recording medium, 600 Network, 700 Server.

INDUSTRIAL APPLICABILITY

The techniques of the present invention may be used to update basic software or firmware in an information processing system with which peripheral devices are connected.

The invention claimed is:

1. An information processing device connected with a relay device, with a display device via the relay device, and with a head-mounted three-dimensional display device via the relay device, the information processing device requiring basic software for operation, the head-mounted device requiring, for operation with the information processing device, head-mounted device firmware installed in the relay device, the basic software including the firmware, the information processing device comprising:

a video image generation device configured to distribute unmodified video images to the relay device, the relay device relaying the unmodified images to the display device, the relay device converting the unmodified images to a format suitable for the head-mounted device before relaying the converted images to the head-mounted device, such that the unmodified images are viewable on the display device in synchronization with the converted images as the converted images are viewed on the head-mounted device;

an update request unit configured to, when the basic software is outdated, supply the information processing device with a latest version of the basic software, and to, when the firmware is outdated, supply the relay device with a latest version of the firmware from the basic software; and a peripheral device power supply state confirmation unit configured to transmit to the generation device information about an on/off state of the head-mounted device;

wherein the request unit and the confirmation unit perform control so that when the head-mounted device is powered on while neither the generation device nor the relay device is powered on, the following occur without user intervention:

the generation device and the relay device are powered on, the latest version of the firmware is requested by the relay device and the latest version of the basic software including the latest version of the firmware are installed in the generation device and the generation device is restarted, and the latest version of the firmware is requested by the latest version of the basic software and installed in the relay device and the relay device is restarted; and so that when the head-mounted device is powered off while the generation device and the relay device are powered on, the latest version of the firmware is not installed in the relay device until the head-mounted device is powered on.

2. The information processing device according to claim 1, wherein the request unit prevents the latest version of the firmware from being installed in the relay device until the head-mounted device is powered on.

3. The information processing device according to claim 1, further comprising:

a version acquisition unit configured to acquire from the relay device information related to a version of the firmware installed in the relay device; and a version comparison unit configured to compare the version of the firmware installed in the relay device with a version of the firmware included in the basic software installed in the information processing device.

4. The information processing device according to claim 3, the version acquisition unit further acquiring from the relay device information related to the version of the basic software which includes the version of the firmware installed in the relay device, and the version comparison unit further comparing the version of the basic software which includes the firmware installed in the relay device with the version of the basic software installed in the information processing device.

5. The information processing device according to claim 4, wherein the latest version of the basic software is not installed in the information processing device until the head-mounted device is turned on.

6. A relay device connecting a head-mounted three-dimensional display device to an information processing device and connecting a display device to the information processing device, the information processing device requiring basic software for operation, the head-mounted device requiring, for operation with the information processing device, head-mounted device firmware installed in the relay device, the basic software including the firmware, the information processing device including a video image generation device configured to distribute unmodified video images to the relay device, the relay device relaying the unmodified images to the display device, the relay device converting the unmodified images to a format suitable for the head-mounted device before relaying the converted images to the head-mounted device, such that the unmodified images are viewable on the display device in synchronization with the converted images as the converted images are viewed on the head-mounted device, the relay device comprising:
    an update unit configured to, when the firmware is outdated, receive from the information processing device a latest version of the firmware from a latest version of the basic software supplied to the information processing device when the basic software is outdated; wherein the information processing device includes a peripheral device power supply state confirmation unit configured to transmit to the generation device information about an on/off state of the head-mounted device; and
    the update unit and the confirmation unit perform control so that
        when the head-mounted device is powered on while neither the generation device nor the relay device is powered on, the following occur without user intervention: the generation device and the relay device are powered on, the latest version of the firmware is requested by the relay device and the latest version of the basic software including the latest version of the firmware are installed in the generation device and the generation device is restarted, and the latest version of the firmware is requested by the latest version of the basic software and installed in the relay device and the relay device is restarted; and so that
when the head-mounted device is powered off while the generation device and the relay device are powered on, the latest version of the firmware is not installed in the relay device until the head-mounted device is powered on.

7. The relay device according to claim 6, wherein the update unit does not receive the latest version of the firmware until the head-mounted device is powered on.

8. The relay device according to claim 6, further comprising:
    a version notification unit configured to acquire information related to a version of the firmware installed in the relay device and notify the information processing device of the information.

9. The relay device according to claim 8, wherein the version notification unit further notifies the information processing device of information related to a version of the basic software requested by the firmware installed in the relay device.

10. The relay device according to claim 6, further comprising:
    a distribution unit configured to convert and distribute as needed a video image generated by the information processing device,
    wherein the distribution unit converts the video image for display on a display device mounted on the head-mounted device and distributes the converted image to the head-mounted device.

11. An information processing system comprising:
    an information processing device; and
    a relay device connecting a head-mounted three-dimensional display device to the information processing device and connecting a display device to the information processing device, the information processing device requiring basic software for operation, the head-mounted device requiring, for operation with the information processing device, head-mounted device firmware installed in the relay device, the basic software including the firmware;
        wherein the information processing device includes a video image generation device configured to distribute unmodified video images to the relay device, the relay device relaying the unmodified images to the display device, the relay device converting the unmodified images to a format suitable for the head-mounted device before relaying the converted images to the head-mounted device, such that the unmodified images are viewable on the display device in synchronization with the converted images as the converted images are viewed on the head-mounted device; and
        wherein the information processing device further includes an update request unit configured to, when the basic software is outdated, supply the information processing device with a latest version of the basic software, and to, when the firmware is outdated, supply the relay device with a latest version of the firmware from the basic software, and
        the relay device includes an update unit configured to, when the firmware is outdated, receive from the information processing device the latest firmware from the basic software, and
        the information processing device further includes a peripheral device power supply state confirmation unit configured to transmit to the generation device information about an on/off state of the head-mounted device;
        wherein the request unit, the update unit and the confirmation unit perform control so that
        when the head-mounted device is powered on while neither the generation device nor the relay device is powered on, the following occur without user intervention:
    the generation device and the relay device are powered on, the latest version of the firmware is requested by the relay device and the latest version of the basic software including the latest version of the firmware are installed in the generation device and the generation device is restarted, and the latest version of the firmware is requested by the latest version of the basic software and installed in the relay device and the relay device is restarted; and so that when the head-mounted device is powered off while the generation device and the relay device are powered on, the latest version of the firmware is not installed in the relay device until the head-mounted device is powered on.

12. The information processing system according to claim 11, wherein the information processing device includes:
a version acquisition unit configured to acquire from the relay device information related to a version of the firmware version installed in the relay device, and
a version comparison unit configured to compare the version of the firmware installed in the relay device with a version of the firmware included in the basic software installed in the information processing device, wherein the relay device includes a version notification unit configured to acquire information related to the version of the firmware installed in the relay device and notify the information processing device of the information.

13. The information processing system according to claim 12, wherein the version acquisition unit further acquires from the relay device information related to the version of the basic software which includes the version of the firmware installed in the relay device,
the version comparison unit further comparing the version of the basic software which includes the firmware installed in the relay device with the version of the basic software version installed in the information processing device, and
the version notification unit further notifies the information processing device of information related to the version of the basic software requested by the firmware installed in the relay device.

14. A software update method updating head-mounted device firmware installed in a relay device or basic software of an information processing device, the relay device and the information processing device being included in an information processing system, the relay device being used to connect a head-mounted three-dimensional display device to the information processing device and to connect a display device to the information processing device, the information processing device requiring the basic software for operation, the head-mounted device requiring, for operation with the information processing device, the firmware installed in the relay device, the basic software including the firmware, the information processing device including a video image generation device configured to distribute unmodified video images to the relay device, the relay device relaying the unmodified images to the display device, the relay device converting the unmodified images to a format suitable for the head-mounted device before relaying the converted images to the head-mounted device, such that the unmodified images are viewable on the display device in synchronization with the converted images as the converted images are viewed on the head-mounted device, the software update method comprising:
determining the basic software is outdated, supply the information processing device with a latest version of the basic software, and to, when the firmware is outdated, supply the relay device with a latest version of the firmware from the basic software; wherein
the information processing device includes a peripheral device power supply state confirmation unit configured to transmit to the generation device information about an on/off state of the head-mounted device;
wherein the request unit and the confirmation unit perform control so that
when the head-mounted device is powered on while neither the generation device nor the relay device is powered on, the following occur without user intervention:
the generation device and the relay device are powered on, the latest version of the firmware is requested by the relay device and the latest version of the basic software including the latest version of the firmware are installed in the generation device and the generation device is restarted, and the latest version of the firmware is requested by the latest version of the basic software and installed in the relay device and the relay device is restarted; and so that
when the head-mounted device is powered off while the generation device and the relay device are powered on, the latest version of the firmware is not installed in the relay device until the head-mounted device is powered on.

15. The software update method according to claim 14, further comprising:
acquiring from the relay device information related to a version of the firmware installed in the relay device; and
comparing the version of the firmware installed in the relay device with a version of the firmware included in the basic software installed in the information processing device.

16. The software update method according to claim 15, acquiring information related to the version of the basic software which includes the version of the firmware installed in the relay device,
comparing the version of the basic software which includes the firmware installed in the relay device with the version of the basic software version installed in the information processing device.

* * * * *

UNITED STATES PATENT AND TRADEMARK OFFICE
CERTIFICATE OF CORRECTION

PATENT NO. : 10,782,957 B2
APPLICATION NO. : 15/556214
DATED : September 22, 2020
INVENTOR(S) : Syunsuke Bamba and Akitsugu Tsuchiya It is certified that error appears in the above-identified patent and that said Letters Patent is hereby corrected as shown below:

In the Claims

In Column 15:
Line 10 Claim 12, change "firmware version installed" to --firmware installed--.
Line 28 Claim 13, change "software version installed" to --software installed--.

In Column 16:
Line 50 Claim 16, change "software version installed" to --software installed--.

Signed and Sealed this
Twenty-second Day of December, 2020

Andrei Iancu
*Director of the United States Patent and Trademark Office*